Patented June 5, 1928.

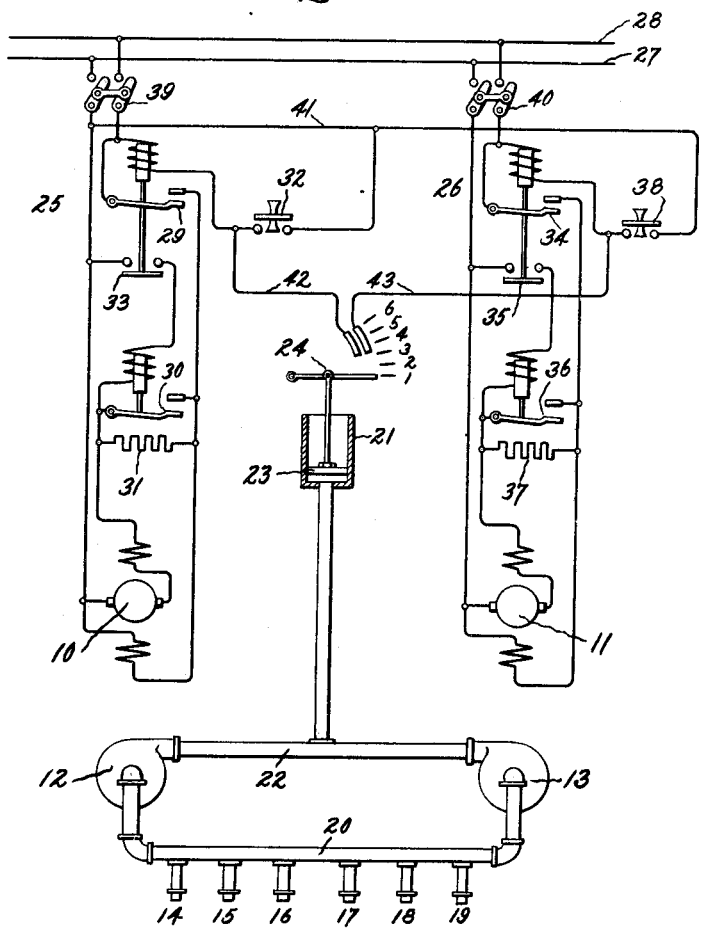

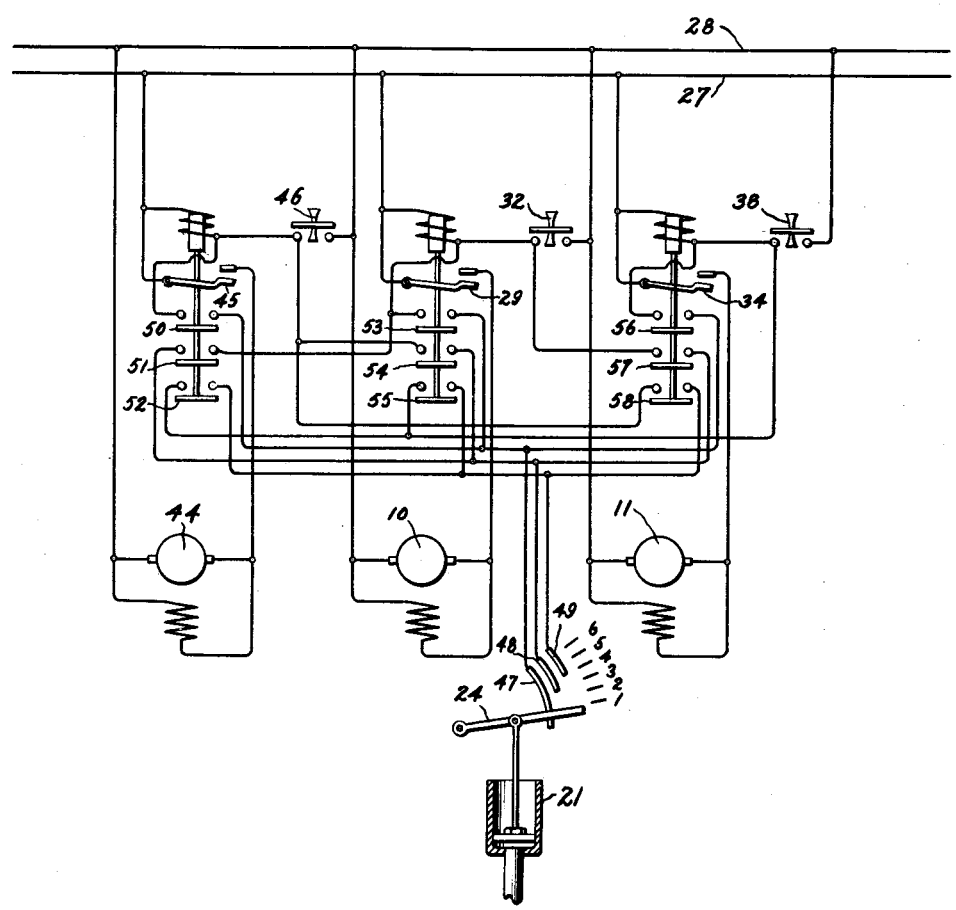

1,672,690

UNITED STATES PATENT OFFICE.

CLAUDE C. RUNNER, OF SCHENECTADY, NEW YORK, ASSIGNOR TO GENERAL ELECTRIC COMPANY, A CORPORATION OF NEW YORK.

CONTROL SYSTEM AND APPARATUS FOR ELECTRICAL DEVICES.

Application filed August 6, 1924. Serial No. 730,495.

My invention relates to electric control systems and apparatus and more particularly to control systems and apparatus for a plurality of electric translating devices, such as a plurality of electric motors and the like.

In such electric control systems, it is often desirable to operate only a portion of the several motors or other electrical devices, particularly where each is arranged to perform a portion of a common duty, and to have the remaining devices brought into operation by automatic means responsively to a predetermined condition. For example, in a vacuum system, having a pair of motor operated exhausting fans designed to jointly handle the maximum exhausting duty of the system, the operation of a single fan may be sufficient to care for the average exhausting requirements and the other motor driven fan may be maintained in reserve and arranged to be brought into operation by an automatically actuated master switch responsively to a predetermined condition occurring in the vacuum system as the exhausting duty is increased to the maximum.

Although not necessarily limited thereto, my invention provides a control system which advantageously may be applied to control the several motors or other electrical translating devices of a system such as just described for the reason that my improved control system permits any selected one or any selected portion of the electrical devices in such a system to be connected to a source of supply for initial operation and the remainder of the devices to be then brought into operation by the automatically actuated means responsively to predetermined conditions. Thus different ones of the motors or other electrical devices may be initially operated at different times and the duty to be performed thereby may be distributed more equally among all the motors or other devices. The practical advantages of thus proportioning the duty and consequently the normal wear and deterioration among the several electrical devices as well as the general selectivity and flexibility of control afforded by my invention will be evident to those skilled in the art.

For a better understanding of my invention, reference is had to the following description in connection with the accompanying drawing, in which Fig. 1 diagrammatically illustrates the invention embodied in a control system for a pair of electric motors for the purpose of explaining the principles thereof, and Fig. 2 shows a control system for more than two motors embodying the invention.

The novel features which I believe to be characteristic of my invention are pointed out with particularity in the appended claims.

Referring to Fig. 1 of the drawing, the electrical devices controlled according to my invention comprise the electric motors 10 and 11. The motors 10 and 11 are arranged respectively to drive the exhausting apparatus 12 and 13 of a vacuum system having the ports 14, 15, 16, 17, 18 and 19 in the vacuum chamber 20 and the automatically actuated device 21 responsive to the pressure in the exhaust chamber 22. The automatically actuated device 21 comprises the pressure responsive member 23 which may be a suitable diaphragm or a reciprocating piston as shown, and the master switch mechanism 24, which is arranged to be automatically operated through the several positions indicated as 1, 2, 3, 4, 5, and 6 by the pressure responsive member 23.

For selectively operating either of the motors 10 and 11, two corresponding sets of control apparatus 25 and 26 are provided for independently connecting the respective motors to the supply lines 27 and 28. The control apparatus 25, in the preferred form shown, comprises the electromagnetic line switch 29, the electromagnetic accelerating switch 30, the starting resistance 31 and the manually operated control switch 32. Each of the electromagnetic switches 29 and 30 is biased to the open position shown and is operable to the position in which its respective contacts are closed upon the proper energization of its respective operating winding. The starting resistance 31 is of suitable ohmic value to effect a smooth and easy starting of the motor 10 and the control switch 32 is operable from the open position shown to the closed position and is arranged to remain in the position to which it is last operated. It will be observed that line switch 29 is provided with an auxiliary contact 33 which is connected to control the energizing circuit for accelerating switch 30.

The control apparatus 26 likewise includes a line switch 34 provided with auxiliary contact 35, an accelerating switch 36, a starting resistance 37 and a control switch 38, each of which is similar to the corresponding parts of the control apparatus 25 previously described.

If desired, the manually operated disconnecting switches 39 and 40 may be interposed between the respective sets of control apparatus 25 and 26 and the supply lines 27 and 28.

As thus constructed and arranged and with the parts in their respective positions shown in the drawing the operation of my improved control system and apparatus in selectively operating either of the motors 10 and 11 and automatically operating the unselected motor is as follows.

After operating the disconnecting switches 39 and 40 to their closed positions with the supply lines 25 and 26 suitably energized to operate the motors 10 and 11, either or both of the manual control switches 32 and 38 may then be operated to the closed position to individually effect the energization and consequent operation of the corresponding motors 10 and 11. However, let us assume that motor 10 is selected for initial operation and that the motor 11 is maintained in reserve for control by the automatically actuated master switch 24. Control switch 32 is moved to the closed position by manual operation of the start button with which it is provided and establishes an energizing circuit for the operating winding of electromagnetic line switch 29 from supply line 27 through the left hand blade of disconnecting switch 39, conductor 41, control switch 32, the operating winding of switch 29, and the right hand blade of disconnecting switch 39 to the other supply line 28. Line switch 29 at once responds and connects the motor 10 in series with the starting resistance 31 to the supply lines 27 and 28. Upon the closure of line switch 29, the operating winding of acceleration switch 30 is connected through the auxiliary contact 33 across the armature of motor 10 and when the latter has accelerated sufficiently to generate the counter-electromotive force required to operatively energize the winding of accelerating switch 30, the latter thereupon responds to close its contact and short circuit the starting resistance 31, thereby further accelerating the motor 10 and the exhausting apparatus 12 to full running speed.

With all of the ports in the vacuum chamber 20 closed, the exhausting apparatus 12 will create a vacuum therein of a value depending upon the capacity of the particular exhausting apparatus employed. Under these conditions, the pressure in the exhaust chamber of the vacuum system is at a comparatively low value and the pressure responsive member 23 of the automatic device 21 consequently maintains the switch member 24 near the position indicated in the drawing.

If, now, the ports in the vacuum chamber 20 are successively opened to operate suitable vacuum devices, such as cleaning nozzles and the like, the exhaust apparatus 12 will be required to exhaust an increasing amount of air which is admitted through the respective ports. The capacity of the exhausting apparatus 12 is such that it will effectively remove the air admitted through only a certain number of the ports in the vacuum chamber 20, this capacity being three of the ports in the system illustrated. Thus, with four of the ports in the vacuum chamber open, the exhaust apparatus 12 will remove an increased volume of air from the vacuum chamber 20 which is sufficient to create a predetermined pressure in the exhaust chamber 22 of the vacuum system. The pressure responsive member 23 of the pressure actuated mechanism 21 is designed to respond to this predetermined pressure in the exhaust chamber and actuate the master switch 24 to the position 4 in which the switch contacts connect the conductor 42 to the conductor 43. This automatically effects the operation of motor 11 in the following manner: Closure of the pivoted switch 24 establishes an energizing circuit for the electromagnetic line switch 34 from the supply line 27 through the left hand blade of disconnecting switch 39, the conductor 41, the control switch 32, the conductor 42, the switch 24, the conductor 43, the operating winding of line switch 34 and the right hand blade of disconnecting switch 40 to the other supply line 28. Upon the resulting closure of line switch 34, motor 11 is connected in series with the starting resistance 37 to the supply lines 27 and 28 and the operating winding of the accelerating switch 36 is connected across the armature of motor 11 through the auxiliary contact 35 and responds after the partial acceleration of motor 11 to short circuit the starting resistance 37, thus accelerating the motor 11 and the exhausting apparatus 13 to full running speed. The additional capacity of exhausting apparatus 13 is then sufficient to effectively maintain the desired vacuum in the vacuum chamber 20 even upon the opening of an additional number of ports or of all the ports in the vacuum chamber 20.

It will be evident that should the number of open ports in the vacuum chamber 20 be reduced to three at any time, the pressure in the exhaust chamber 22 then will fall below the predetermined value and the pressure responsive member 23 of automatic device 21 will automatically move the master switch 24 so as to disconnect the conductor 43 from conductor 42. This interrupts the energizing circuit for the operating winding of line switch 34 and the latter consequently opens according to its bias and disconnects the motor 11 from the supply lines 27 and 28, and thereby stops the operation of exhausting apparatus 13. Thus it will be seen that upon the initial operation of exhausting apparatus 12 by motor 10, the motor 11 and exhausting apparatus 13 are automatically brought into operation by the automatic device 21 only when the requirements in the vacuum system are beyond the capacity of motor 10 and the exhausting apparatus 12.

At any time after the operation of control switch 32 to the closed position, the further operation of either motor 10 or the joint operation of motors 10 and 11 may be stopped by merely operating the control switch 32 to the open position by means of the stop button with which it is provided. Opening of control switch 32 interrupts the energizing circuit of the line switch 29 as well as the energizing circuit through the pressure actuated switch 24 for the line switch 34. The resulting opening of either switch 29 or both of the switches 29 and 34 disconnects the corresponding motors 10 and 11 from the supply lines 27 and 28.

If now it should be desired to initially operate the motor 11, the control switch 38 may be manually closed to establish an energizing circuit for the operating winding of electromagnetic switch 34 from the supply line 27 through the left hand blade of the disconnecting switch 39, the conductor 41, the control switch 38, the operating winding of line switch 34 and the right hand blade of disconnecting switch 40 to the other supply line 28. Line switch 34 thereupon responds and the motor 11 is connected to the supply lines 27 and 28 and accelerated to full running speed in a manner similar to that previously described. Since the exhausting apparatus 13 driven by the motor 11 is also of a capacity sufficient to effectively maintain the vacuum in the vacuum chamber with only three of the ports open, the automatically actuated mechanism 21 will respond upon the opening of a fourth port at the same predetermined pressure in the exhaust chamber as before and automatically effect the operation of the motor 10 by connecting the conductor 43 to the conductor 42. In this case, however, the closure of the automatically actuated master switch 24 establishes an energizing circuit for the line switch 29. The latter responds and connects the motor 10 to supply lines 27 and 28 for acceleration and operation in an obvious manner.

Thus it will be seen that regardless of which one of the motors 10 and 11 is initially selected for operation, the pressure actuated device 21 effects the operation of the other motor upon the occurrence of a predetermined condition in the vacuum system.

As shown in Fig. 2, my invention may be applied to both selectively and automatically control three electrical translating devices such as the motors 10, 11 and 44.

In this case the electromagnetic line switch 45 and the manually operated control switch 46 are provided for connecting the motor 44 to the supply lines 28 and 27 and the master switch 24 of the automatic device 21 is provided with three contact segments 47, 48 and 49 of different lengths. The master switch 24 is arranged to cooperate with the auxiliary switches 50 to 58 with which the electromagnetic switches 45, 29, and 34 are respectively provided in a manner which will be more fully understood from the following description of the operation of this form of my invention.

With the supply lines 28 and 27 suitably energized, any one of the motors 44, 10 and 11 may be selected for initial operation by operating the corresponding manual control switch 46, 32 or 38 from the position shown to the closed position. Assuming that the control switch 46 is closed to energize electromagnetic switch 45 and connect the motor 44 to the supply lines 28 and 27, then upon operation of the master switch 24 into engagement with the segment 48 by the automatic device 21 an energizing circuit for the operating winding of electromagnetic switch 29 is established from the supply line 28 through the manual control switch 46, the auxiliary switch 50 with the electromagnetic switch 45 in the closed position, the contact segment 47, master switch 24, contact segment 48, the auxiliary switch 51 and the operating winding of electromagnetic switch 29 to the other supply line 27. Switch 29 at once closes and connects the motor 10 to the supply lines. Upon continued movement of the master switch 24 by the automatic device 21 contact is established with the segment 49 and an energizing circuit for the operating winding of electromagnetic switch 34 is completed from the segment 47 which is connected to the supply line 28 as previously described, through the master switch 24, the contact segment 49, the auxiliary switch 52 with electromagnetic switch 45 in the closed position and the operating winding of switch 34 to the other supply line 27. Thereupon switch 34 closes and connects the motor 11 to the supply lines 27 and 28.

It will be evident that should the master switch 24 be returned to the position shown due to a reduction in pressure to which the automatic device 21 is responsive, the electromagnetic switch 34 is deenergized upon the disengagement of the segment 49 and returns to the position shown to disconnect the motor 11 from the supply line and the electromagnetic switch 29 likewise is deenergized upon the disengagement of contact segment 48 and disconnects the motor 10. The operation of motor 44 continues however until the manual control switch 46 is returned to the open position shown thereby de-energizing the electromagnetic switch 45 and disconnecting the motor 44 from the supply lines.

If it is desired to initially operate the motor 10, the manual control switch 32 is operated from the position shown to the closed position. This energizes the operating winding of electromagnetic switch 29 and the latter closes and connects the motor 10 to the supply lines 28 and 27. Should the master switch 24 now be operated into engagement with segment 48 by the automatic device 21, the operating winding of electromagnetic switch 45 is energized through a circuit extending from supply line 28 through the manual control switch 32, the auxiliary switch 53 with the electromagnetic switch 29 in the closed position, contact segment 47, master switch 24, contact segment 48, auxiliary switch 54 and the operating winding of electromagnetic switch 45 to the other supply line 27. The resulting closure of electromagnetic switch 45 connects the motor 44 to the supply lines 27 and 28. Further movement of master switch 24 into engagement with segment 49 completes an energizing circuit for electromagnetic switch 34 from contact segment 47, master switch 24, contact segment 49, auxiliary switch 55, and the operating winding of switch 34 to supply line 27. Thus electromagnetic switch 34 is energized to close and connect motor 11 to the supply lines. Operation of manual switch 32 to the open position effects the de-energization of the electromagnetic switches 29, 45 and 34 and the consequent disconnection of the motors 10, 44 and 11 from the supply lines 27 and 28 in an obvious manner.

If the manual control switch 38 is closed to energize electromagnetic switch 34, the motor 11 is connected to the supply lines 27 and 28 for initial operation. In this case, upon operation of the master switch 24 into engagement with the contact segment 48, the electromagnetic switch 29 is energized through a circuit extending from supply line 28 through the manual control switch 38, the auxiliary switch 56 with electromagnetic switch 34, in the closed position, segment 47, master switch 24, segment 48, auxiliary switch 57, and the operating winding of electromagnetic switch 29 to the other supply line 27. Switch 29 at once closes and connects the motor 10 to the supply lines. Should the master switch 24 be operated into engagement with segment 49, the electromagnetic switch 45 is energized through a circuit extending from segment 47, master switch 24, segment 49, auxiliary switch 58, and the operating winding of switch 45 to the supply line 27. Upon response of switch 45, the motor 44 is connected to the supply line.

From the foregoing it will be evident that by means of my invention, any one of the electric motors 44, 10 and 11 may be selected for initial operation and the remaining motors are automatically brought into operation responsively to operation of the master switch 24.

While I have shown the invention applies to control three electric motors, it will be evident to those skilled in the art that my invention may be extended to control any additional number of motors by providing an additional contact segment for master switch 24 and an additional auxiliary contact on each of the electromagnetic line switches for each additional motor. Furthermore, it will be understood that the master switch 24 need not necessarily be operated by a pressure responsive device.

In accordance with the provision of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. In combination, a plurality of electric translating devices, a plurality of manually controlled switches, each operable at will to connect a corresponding one of said devices to a source of supply, a master switch automatically operated in response to predetermined conditions for controlling the connection of said devices to the source of supply, and connections jointly controlled by each of said manually controlled switches and said master switch whereby after any portion of said devices has been selected and initially connected to the source of supply in response to the operation of the corresponding manually controlled switches the remainder of said devices are connected successively to the source of supply under the control of said master switch independently of the manual control for said remaining devices.

2. In combination, an automatically operated master switch mechanism, a plurality of electric translating devices, each having a separately operable switch for connecting the same to a source of supply independently of said master switch mechanism, and connections jointly controlled by the said master switch and each of said separately operable switches whereby after any one of said devices has been first connected to the source of supply, the remainder of said devices are successively connected to the source of supply through the operation of said master switch mechanism.

3. In a control system for a plurality of electric translating devices, the combination with switch mechanism for controlling the energization of said devices, of means for operating the said switch mechanism at will to effect the separate energization of any selected device and the joint energization of any selected portion of the devices, and automatic means responsive to predetermined conditions and connected independently of operation of said first means to control operation of the said switch mechanism to energize the remaining devices after operation of said first means to effect energization of any selected one of the devices.

4. In a control system for a plurality of electric translating devices, the combination with a plurality of switches, each selectively operable at will to connect a corresponding one of said devices to a source of supply, of automatic means operatively connected with each of said switches to be rendered effective upon operation of any one of said switches for automatically effecting operation of the remainder of said switches to connect the corresponding devices to the source of supply in a sequence determined by the said one switch selected for initial operation in response to predetermined conditions.

5. In a control system for a plurality of electrical translating devices, the combination with a plurality of electromagnetic switches each for connecting a corresponding one of said devices to a source of supply, of manual control means for energizing any selected one of said switches to connect the corresponding one of said devices to the said source, and automatic control means connected with each of said electromagnetic switches to be rendered effective upon the energization of any one of said switches by said first means for successively energizing the remainder of said switches to connect the corresponding devices to the said source in response to predetermined conditions and in a sequence determined by the said electromagnetic switch selected for initial energization.

6. In an electric control system, the combination with a plurality of separately operable electromagnetic switch mechanisms, each having auxiliary switch mechanism associated therewith for controlling the other electromagnetic switches, of a plurality of manually operable control switches, each operable to open and close an energizing circuit for a corresponding one of said switch mechanisms, an automatically actuated master switch, and electrical connections jointly controlled by the auxiliary switch mechanism of each of said electromagnetic switches and the said master switch whereby upon the energization of any one of said switch mechanisms the remainder of said switch mechanisms are energized successively in response to predetermined conditions.

7. The combination with a pair of electrical devices, of a pair of control switches therefor, each operable to connect a corresponding one of said devices to a source of supply, and an automatically operated master switch connected with each of said control switches to be rendered effective upon operation of any one thereof to connect the device controlled by the other control switch to the source of supply independently of the control switch for said other device.

8. A control system for a plurality of electric motors comprising, a plurality of switch mechanisms, each independently operable to connect a corresponding one of said motors to a source of supply for operation thereof, a device responsive upon the operation of any one of said motors to predetermined conditions and connections between each of said switch mechanisms and said device arranged to automatically place the operation of the switch mechanisms of the remaining motors under the control of the automatic device after any one of the motors is set into operation to start operation of the remaining motors in a sequence determined by operation of the switch mechanism of the motor initially set into operation.

9. A control system for a plurality of electric motors, comprising a plurality of electromagnetic switch mechanisms, each operable to connect a corresponding one of said motors to a source of supply for operation thereof and having auxiliary switches for controlling the operation of the other electromagnetic switch mechanisms, control means for energizing each of said switch mechanisms to effect operation of the corresponding motors, a device responsive upon the operation of any selected one of said motors to a predetermined condition, and electrical connections jointly controlled by the auxiliary switches of each of said electromagnetic switch mechanisms and the said device for automatically energizing another of said switch mechanisms to effect the operation of the corresponding motor after any one of the motors is set into operation.

10. A control system for a plurality of electric motors, each arranged to operate apparatus for exhausting a vented vacuum system, comprising a plurality of electromagnetic switch mechanisms, each operable to connect a corresponding one of said motors to a source of supply and having associated therewith a separate auxiliary switch for controlling the operation of a corresponding one of each of the remaining electromagnetic switch mechanisms, independent control switches for energizing each of said switch mechanisms to effect operation of the corresponding motors, a device responsive to a predetermined condition in the said vacuum system, and electrical connections jointly controlled by the auxiliary switches of each of said electromagnetic switch mechanisms and the said device whereby upon the energization of any one of said switch mechanisms and the occurrence of the said condition the said device automatically controls the energization of the remainder of said switch mechanisms to effect the operation of the corresponding motors.

In witness whereof, I have hereunto set my hand this 5th day of August, 1924.

CLAUDE C. RUNNER.